(12) United States Patent
Shayne et al.

(10) Patent No.: US 12,125,184 B2
(45) Date of Patent: Oct. 22, 2024

(54) MONITORING STANDING WATER AND DRAINAGE PROBLEMS

(71) Applicant: ObjectVideo Labs, LLC, Tysons, VA (US)

(72) Inventors: Ethan Shayne, Clifton Park, NY (US); Dana Eubanks, Herndon, VA (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 446 days.

(21) Appl. No.: 17/665,761

(22) Filed: Feb. 7, 2022

(65) Prior Publication Data
US 2022/0254004 A1 Aug. 11, 2022

Related U.S. Application Data

(60) Provisional application No. 63/148,285, filed on Feb. 11, 2021.

(51) Int. Cl.
*G06T 7/00* (2017.01)
*E02B 11/00* (2006.01)
*G06V 10/774* (2022.01)
*G06V 10/82* (2022.01)
*G06V 20/52* (2022.01)
*H04N 7/18* (2006.01)

(52) U.S. Cl.
CPC ............ *G06T 7/002* (2013.01); *G06T 7/97* (2017.01); *G06V 10/774* (2022.01); *G06V 10/82* (2022.01); *G06V 20/52* (2022.01); *H04N 7/188* (2013.01); *E02B 11/00* (2013.01); *G06T 2207/20081* (2013.01); *G06T 2207/20084* (2013.01); *G06T 2207/30232* (2013.01)

(58) Field of Classification Search
CPC ...... G06Q 40/08; G06Q 10/20; G06Q 50/163; G06V 20/44; G06V 20/52; G06V 10/82; G06V 10/774; G06T 7/0002; G06T 7/97; G06T 2207/20081; G06T 2207/20084; G06T 2207/30232; H04N 7/188; E02B 11/00
See application file for complete search history.

(56) References Cited

U.S. PATENT DOCUMENTS

| | | | |
|---|---|---|---|
| 7,233,252 B1* | 6/2007 | Hardin | G01F 15/063 340/622 |
| 10,181,079 B2* | 1/2019 | Labrie | G06V 20/176 |
| 10,289,760 B1* | 5/2019 | Oakes, III | G06F 30/20 |
| 11,392,897 B1* | 7/2022 | Gingrich | G06F 30/13 |
| 2017/0221152 A1* | 8/2017 | Nelson | G06Q 40/08 |
| 2020/0239049 A1* | 7/2020 | Dick | G06T 7/40 |
| 2021/0027528 A1* | 1/2021 | Labrie | G06T 17/00 |

* cited by examiner

*Primary Examiner* — Dung Hong
(74) *Attorney, Agent, or Firm* — Fish & Richardson P.C.

(57) ABSTRACT

Systems and methods for detecting and monitoring areas of water damage or water management problems in a property are described. Monitoring devices can be deployed at different locations of a property to obtain sensor data and image data regarding the environmental conditions in potentially problematic areas of the property. An image obtained by the monitoring devices can be processed and compared with reference images or other image data that is filtered in a different manner that the image to identify portions of the image in which water damage or water management problems exist.

20 Claims, 5 Drawing Sheets

MONITORING STANDING WATER AND DRAINAGE PROBLEMS

CROSS-REFERENCE TO RELATED APPLICATION

This application claims the benefit of U.S. Provisional Application No. 63/148,285, filed Feb. 11, 2021, which is incorporated herein by reference in its entirety.

FIELD

This disclosure generally relates to property monitoring systems.

BACKGROUND

Improper property or yard drainage can lead to erosion, damage to gardens or building foundations. In addition, standing water in and around a property can attract and provide breeding grounds for mosquitoes. These problems can be caused for various reasons including, for example, rainwater pooling in areas with poor ground drainage or damaged/incorrectly-installed gutter spouts.

SUMMARY

This disclosure generally describes systems and methods for monitoring a property for potential water damage due to standing water, runoff water, or drainage problems actions to prevent the water damage from occurring at or around the property.

According to implementations, one or more monitoring devices can be deployed around a property. The monitoring devices can include sensors and cameras that capture monitoring data, e.g., sensor data or image data, reflecting the environmental conditions and the presence of standing water or moving water in the property. The sensor and/or camera data can be processed by the monitoring system to identify problematic areas such as areas with standing water, runoff water, or drainage problems. The monitoring system may then send a report or notification to a user, generate recommendations for addressing an identified problem, or take one or more remedial actions.

Other implementations include corresponding systems, apparatus, computer-readable storage media, and computer programs configured to implement the actions of the above-noted methods.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

Figure 1:
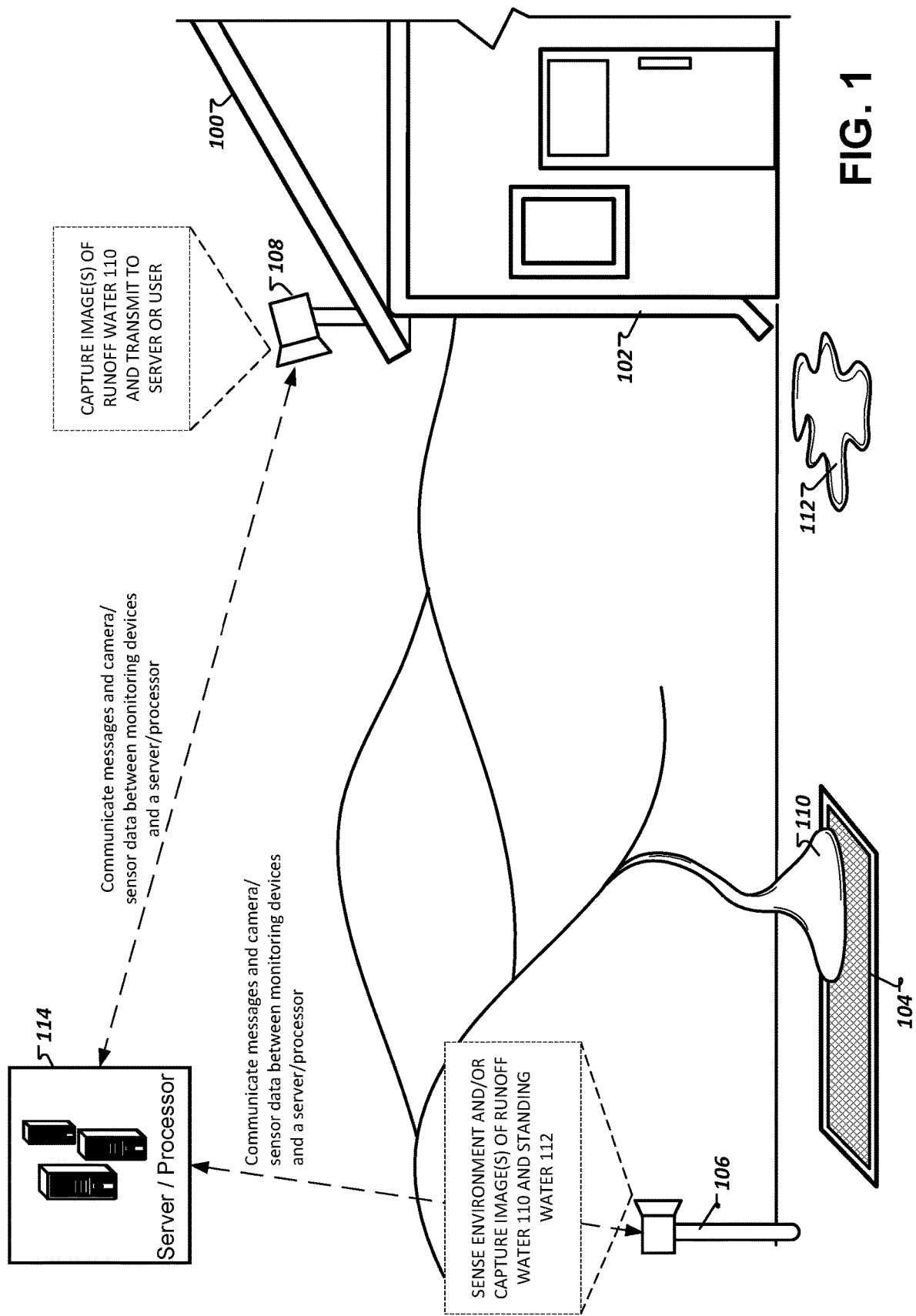
FIG. 1 depicts an example scenario in which running and standing water are present around a property.

Water drainage problems may occur as a result of rain, snow, or broken/leaking water pipes. Water may collect, temporarily or for an extended period of time, in one or more locations and may move in streams at unexpected locations causing damage to property. If a property owner or person overseeing the property (hereinafter referred to as user) does not timely observe water collection and drainage problems, the user may not be able to mitigate water damage or determine the source of the problem. In some cases, the user may fail to observe the drainage problems if the damage is not in the user's view or if the user is not present at the location of the damage when the damage occurs. In some cases, water damage or movement may occur so slowly that it may not be apparent to a user.

In addition, often times, problems such as standing water may not always be obvious or visible to a user. Some standing water pools may only exist for a short period of time after heavy rain. Such standing water may eventually drain away or evaporate, and can disappear fast enough without being noticed. In some instances, the standing water may be hidden from view.

Water around a property that is not drained or managed properly can create a number of issues for a property. For example, foundations around a building can be adversely impacted if water is not properly drained away from the building. Runoff water from a higher elevation can cause flooding damage to a property and bring along with it dirt and soil that can additionally damage the property. Standing water is often also a breeding ground for insects such as mosquitoes, which can then make the property more susceptible to being at risk for mosquito transmitted diseases like malaria or Dengue fever. Therefore, it is important for property owners and managers to take sufficient steps to mitigate the damage that can be caused by water.

To mitigate water damage, the property owner or manager should have sufficient information to implement the correct solutions. Such information can be difficult to obtain because often times standing water or run off water are temporal in nature or are not in direct sight of the property owner or manager and therefore are not observed. In addition, it can be difficult to determine the flow pattern and behavior of water from a single image or during a short observation period. A sufficient period of time or number of images may be needed to determine the water flow pattern and behavior in an area.

This disclosure describes solutions through which a user (who may include a property owner, manager, or renter) can obtain such information and be better prepared to take the necessary actions to prevent water damage from occurring at or around a property. For example, sources of such water drainage problems can be identified using one or more sensors or a combination of sensors, such as drone-based sensors, ground-based mobile robotic sensors, and cameras. These sensors can be used on-demand, periodically, or on a continuous basis.

In some implementations, a monitoring system can track the amount of rainfall, the rate at which visible water disappears from a monitored area, and/or the rate at which soil moisture decreases and combine this data with evaporative factors such as air temperature, humidity, direct sunlight to determine the water flow and/or evaporation rate in the monitored area.

FIG. 1 depicts an example scenario in which running and standing water are present around a property. The property can be located in an area with varying topology such that there can be one or more hills or an uneven ground. The property includes a house 100 equipped with drains and pipes such as downspout 102 to carry water from one area of the property to another. In the depicted example, downspout 102 is used to transfer water away from an elevated portion of the house 100 to the surrounding environment, e.g., the ground, around the house 100, to prevent water from damaging the house 100. The surrounding environment around the house 100 also includes a drain guard 104 that covers drain pipes and gutters used to carry water away from the property. The house 100 is also equipped with sensors such as sensor 106 and cameras such as camera 108.

The camera 108 can be a video/photographic camera or other type of optical sensing device configured to capture images. For instance, the camera 108 can be configured to capture images of an area or environment around or surrounding the house 100. The camera 108 can be configured to capture single, static images of the area and also video images. The camera 108 can operate according to preprogrammed instructions or according to instructions received from remote devices such as computers, sensors, portable electronic devices, and servers. The camera 108 can be configured to operate in response to a trigger (described in more detail below). In some implementations, the camera 108 can trigger integrated or external illuminators (e.g., lights in or around the house 100) to improve image quality. An integrated or separate light sensor can be used to determine if illumination is desired and can result in increased image quality when utilized.

The camera 108 can be programmed with any combination of time/day schedules or other variables to determine whether images should be captured or when triggers occur. The camera 108 can enter a low-power mode when not capturing images. In some implementations, the camera 108 can wake periodically to check for inbound messages from other devices. The camera 108 can be powered by internal, replaceable batteries or solar cells to recharge the battery when light is available.

In some implementations, the camera 108 can communicate directly with a server/processor 114 or other electronic devices through a wired or wireless communication network. The camera 108 can transmit image data through the wired or wireless communication network to other devices, and may receive messages including instructions or notifications from the server/processor 114 or other electronic devices.

In some implementations, sensor 106 can be implemented in various shapes and sizes, and, in general, can be configured to detect environmental conditions around the house 100. The environmental conditions can include, e.g., the presence of rain, snow, sunshine, fog, or smoke. The sensor 106 can include an environmental sensor, such as a temperature sensor, a water sensor, a rain sensor, a humidity sensor, a wind sensor, a light sensor, a smoke detector, an air quality sensor, a camera, or an imaging device.

In some implementations, sensors monitoring the flow rate at various locations on the property can be used. For example, sensors can be used to monitor flow rates from outdoor hose bibs, or be integrated with a lawn sprinkler system so that the water flow at various sources of water on the property can be monitored, and so that the monitoring system can control sprinkler schedules more intelligently. For example, humidity sensors in a lawn area of a property can indicate when the lawn is dry, and water can then be applied to the lawn (and monitored using the water flow sensors) when dry conditions are present. Additionally, the monitoring system can utilize weather forecast models and optimize the sprinkler schedule predictively, for example, by skipping a watering if rain is forecast.

Weather forecast reports and models can be interpolated to determine the volume of water or humidity in or around a property. For instance, some conversion models equate 13 inches of snow to 1 inch of rain (this can range from 1:2 for wet sleet and up to 1:50 for very powdery snow). Such conversions can be performed to determine the likely impact of a weather event on a property and, in some cases, the amount of water that may be drained from the property to avoid water damage.

The sensor 106 can communicate directly with a remote or local server 114 or portable electronic device through a wired or wireless communication network. The sensor 106 can transmit sensor data through the wired or wireless communication network to other devices. For example, sensor 106 can detect when humidity levels are above a particular threshold. In some case, the sensor 106 can be implemented along the ground as a water sensor and can detect a level of water above the ground. The sensor 106 can send a server sensor data indicative of the water level periodically or otherwise according to its programmed instructions.

In the example scenario shown in FIG. 1, the property can also have an area with a drain guard 104. The drain guard 104 may be located at various locations around the house 100. In FIG. 1, the drain guard 104 is located in an area where runoff water 110 from elevated ground is expected. For instance, the house 100 can have uneven ground or can be located near a hill from which runoff water 110 can occur during certain weather events, e.g., when it rains or snow is melting.

However, often times, the drain guard 104 may get covered by dirt or leaves. For example, during fall, with a high volume of leaves falling from trees, drain guards 104 can often get covered up with leaves. When the drain guard 104 is impeded with dirt, leaves, or other impediments, water can begin collecting on or around the drain guard 104 as shown in FIG. 1.

FIG. 1 also depicts standing water 112. This standing water 112 may be located in different areas around the house 100. In the example shown in FIG. 1, the standing water 112 is water that has drained down from the downspout 102 but has not yet found its way to the drains covered by the drain guard 104. Consequently, the property shown in FIG. 1 has water collecting around the drain guard 104 and standing water 112 in other location(s) of the property.

Camera 108 can be used to obtain image data of one or more areas of the property over any period of time. As explained in more detail below, the camera 108 can be programmed to operate in response to a trigger, periodically, or according to instructions received from another electronic device such as server/processor 114. In FIG. 1, camera 108 is attached to a slanted roof of the house 100 so that its field of view includes a driveway of the house 100 and the uneven ground around the house 100. The field of view includes the drain guard 104 so that if the drain guard 104 clogs or if run off water 110 begins to accumulate in or around the drain guard 104, the camera 108 can capture images showing the same.

Sensor 106 is placed in a different area of the property compared to the placement of camera 108 and can be used to obtain additional information. For example, sensor 106 can provide data indicative of the weather or environment around the property at a particular time. In FIG. 1, sensor 106 can be used to detect wind speed or humidity levels. If implemented as a camera, sensor 106 can detect the standing water 112 that is not in the field of view of camera 108. In this manner, sensor 106 and camera 108 can cover multiple areas of the property. If a user is away from the house 100 or inside the house 100 but unaware of the runoff water 110 or standing water 112, the sensor 106 and camera 108 can be used to provide the user notifications indicative of the presence of runoff water 110 or standing water 112 as the property, as described below in more detail with respect to FIG. 3.

Figure 2:
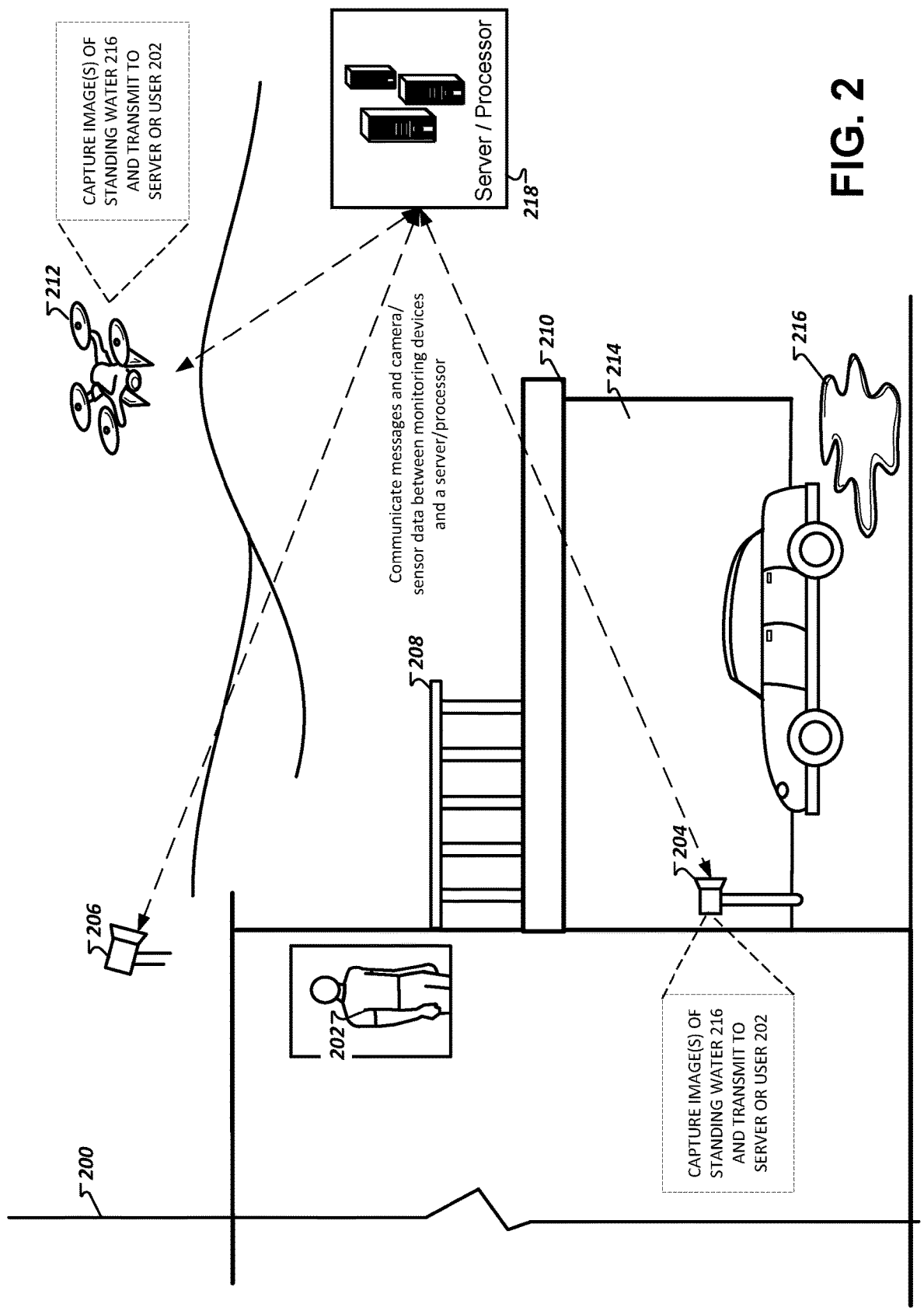
FIG. 2 depicts an example scenario of undesired water gathering in or around a property.

FIG. 2 depicts another example scenario of undesired water gathering in or around a property. FIG. 2 illustrates a house 200 with a garage 214 underneath a first floor roof 210 and balcony 208. The user 202, who is present on the second floor of the house 200, cannot see objects or problematic areas underneath the first floor roof 210. As such, the user 202 cannot see the standing water 216 that is present in and around the garage 214.

A monitoring system that monitors the house 200 includes a camera 204, sensor 206, a drone 212, and a server/processor 218. Camera 204 operates in a similar manner as camera 108, sensor 206 operates in a similar manner as sensor 106, and server/processor 218 operates in a similar manner as server/processor 114. The drone 212 can include a camera and can scan the area around the house 200 and can be programmed to obtain images in or around the house 200. In some implementations, miniature drones could be used to search for difficult-to-reach potential problem areas, and, if permitted by the property owner and in compliance local laws, enter those areas to look for problems. The miniature drones can operate much like a borescope, but with more range and flexibility. The potential problem areas can include gutter downspouts, shadowed overhangs, and/or buried drainage pipes, such as gutter downspout extensions or driveway drains.

In the example shown in FIG. 2, even though the standing water 216 is not visible to user 202, the standing water 216 can be captured by camera 204 or drone 212. Either the camera 204 or drone 212 can be used to provide the user 202 notifications indicative of the presence of the standing water 216 around the house 200, as described below in more detail with respect to FIG. 3.

Figure 3:
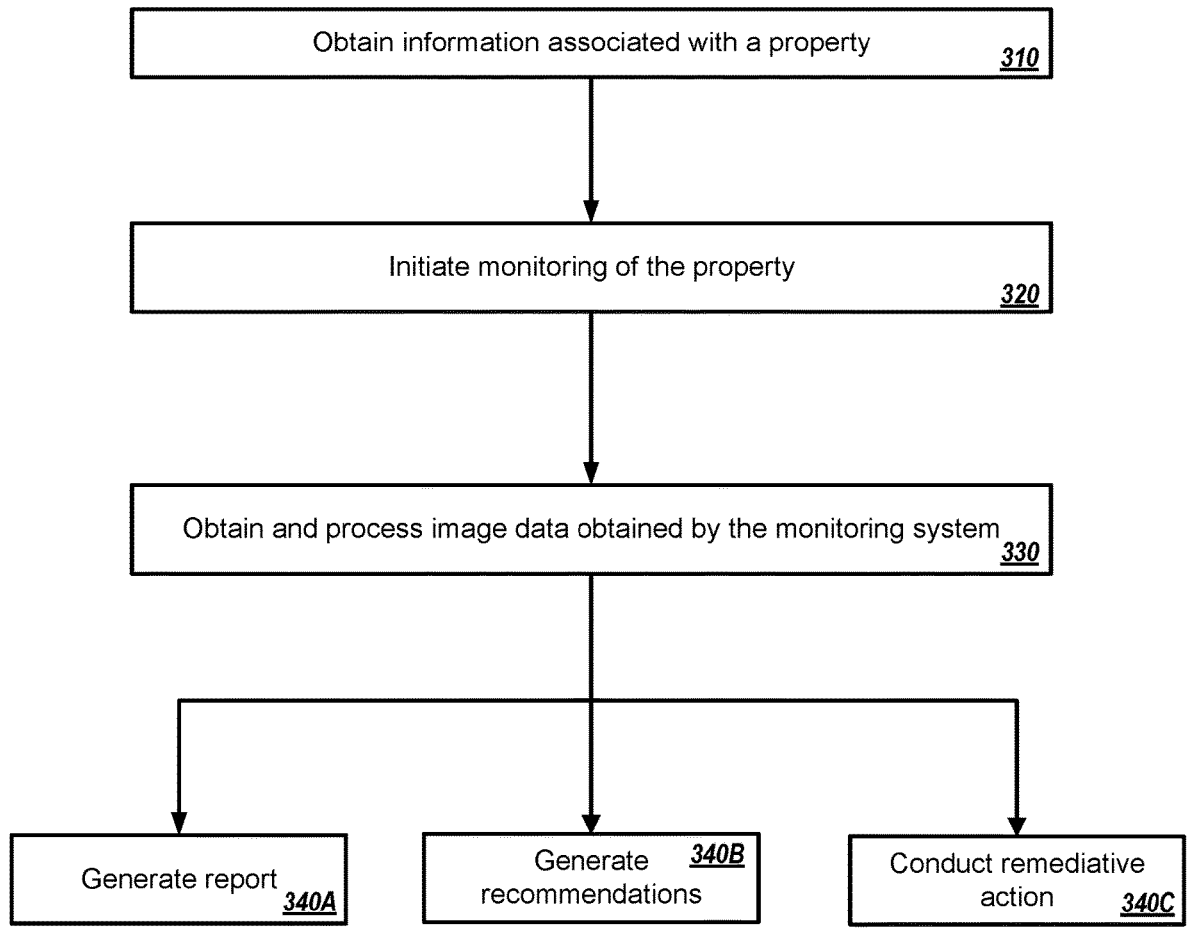
FIG. 3 depicts a flowchart of a method for monitoring a property to identify standing water and drainage problems.
Figure 4:
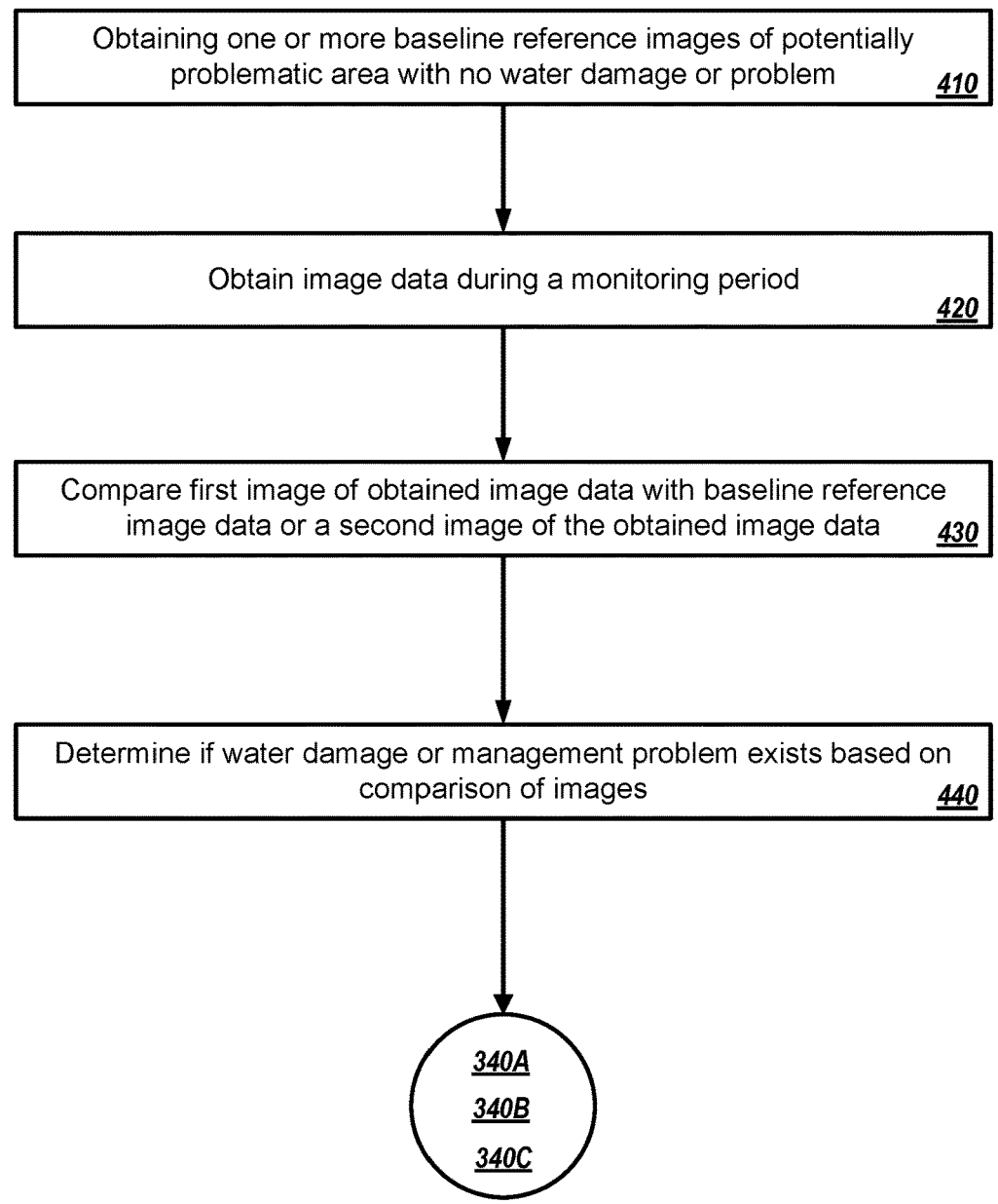
FIG. 4 depicts a flowchart of a monitoring method to obtain and process image data.

FIG. 3 depicts a flowchart of a method for monitoring a property to identify standing water and drainage problems. The method can be executed by a monitoring system, as described below with respect to FIG. 4. As an initial operation, information about a particular property can be obtained (310). The information obtained can include one or more of the address of the property, terrain information of the area around the property, dwellings in the property, a layout of a home on the property, the pipes and drains in and connected to the property, and various other types of information that could provide information on the area to be monitored.

In some implementations, the monitoring system may store data describing a model of the property that may be generated by the property owner or from blueprints, government records, or by observation. The model can provide estimates of the size of various impermeable surfaces (e.g., pavements, building roofs, etc.) and can map likely rainfall from those surfaces to anticipated areas of drainage. For example, the property model may indicate that a roof is 10 m×20 m, with the front half draining to one downspout and the rear draining to a second. Therefore, each downspout is expected to handle the rainfall for a 100 m² area. And for each centimeter of rain, each downspout will see 1000 liters of water. Such a property model can provide information on different areas of the property and the likelihood of each area's capacity to handle water drainage during a rain event.

The monitoring system can use weather data (or a local rain gauge) to estimate the amount of water flowing through any part of the property.

The information can be obtained by requesting a user to provide the information or by querying one or more electronic databases for information. For example, information describing a lot of land associated with a property can be obtained by submitting a request to a government entity such a county office responsible for maintaining such information. Information regarding topology of areas around the address of a property can be obtained from various commercial and non-commercial databases.

Based on the information obtained, potential problematic locations can be identified that could require monitoring. For example, if there is a hill or slanted ground level inclining downwards towards a building, the area at the bottom of the inclined ground or hill can be identified as a potentially problematic location to monitor. In another example, based on the drainage and pipes deployed around a house, an area where water exits a pipe such a downspout or an area where water enters such as a drain or gutter cover is identified as an area to monitor.

In some implementations, processors can implement or be connected to neural networks that are trained with data to identify potential problematic locations. In some implementations, the system can have a user interface through which a system user can review property information and provide input identifying potential problematic locations or can confirm locations identified by the system as being potential problematic. The neural networks can be trained using training data indicative of images or user input indicating water management problems or water damage.

For example, several images of standing water near a building at different angles can be provided as training data for detecting standing water in an image. In addition, user input with keywords related to standing water can be used as training data. The keywords can be used as tags to tag an image as including a particular type of water management problem or water damage, such as standing water. Accordingly, when new image data or user input is received, the system can execute one or more object comparison methods in image processing techniques to determine if the received image data includes one or more portions that correspond to standing water indicated in the training image data. In some cases, the system can implement a word matching algorithm to determine if the received user input includes one or more keywords that match words in user input training data identifying standing water.

In general, the system can maintain a list of various types of potentially problematic areas and determine the likely presence of such areas in a property based on the information obtained. The list of various types of problematic areas can be determined by the system, e.g., using the neural networks, or can be based on information provided manually by a user or administrator. For example, an area at the bottom of a slope that is near a building can be identified by the neural networks using the above-described techniques or manually by a user as being a potentially problematic area. The system can then store information identifying the area at the bottom of a slope that is near the building in the list of potentially problematic areas. The information identifying the area at the bottom of a slope near the building can include various types of information such as, for example, image data or an alphanumeric description of the area at the bottom of a slope that is near the building Based on the obtained property information and the identified potentially problematic locations, a proposal can be provided to the user for implementing a monitoring system including various monitoring devices such as sensors and camera at one or more locations to monitor the potentially problematic areas in a property. Upon obtaining the user's consent or making modifications to the proposal based on user feedback, monitoring of the property can be initiated by, for example, activating the monitoring devices around the property (320). In some cases, user consent may not be required or may have been obtained in advance and therefore is not required after obtaining the property information in operation 310.

The monitoring system can include one or more monitoring devices such as sensors and cameras, and can be configured to perform monitoring operations periodically, in response to a trigger, or according to a determined schedule or set of instructions. For example, the monitoring system can be scheduled to perform monitoring operations at night time (e.g., 1-3 a.m.) during a week when it is expected to rain a lot at night and a user is likely asleep. In another example, a weather event, such as a snow storm, may be expected on a particular day, so the monitoring system can be scheduled to monitor the property on the particular day.

In some implementations, the monitoring system can be configured to perform monitoring operations in response to a trigger. Various triggers can be used. In one example, the trigger can be a weather event. If the system receives information that a weather event such as rain or snow is likely to occur over a particular period of time, the system can generate a trigger signal and transmit the trigger signal to one or more monitoring devices with information to perform monitoring at a particular period of time associated with the weather event. Information indicating that a weather event is about to occur can be received from various sources, e.g., weather or meteorological databases.

In another example, the trigger can be based on data received from one or more monitoring devices that are already activated. For example, a temperature sensor can sense the temperature in an area around the property and can transmit the temperature data to a processor or server in the system. A humidity sensor can also sense that the humidity around a property and can send data indicative of the humidity levels to the processor or server. After receiving data from the sensors, the processor or server can determine whether the temperature around the property has satisfied a particular threshold (e.g., dropped below a temperature threshold level, e.g., 32° F. (freezing point)) and/or whether the humidity level around the property has satisfied a humidity threshold, e.g., 90% humidity. Based on the determinations, the processor or server can then generate a trigger signal with instructions for additional actions.

For example, if the processor or server determines that the humidity level around the property has exceeded the humidity threshold, the processor or server can generate a trigger signal and transmit the trigger signal for a camera in the property to monitor an area in the camera's field of view that was previously identified as a potentially problematic area. In response to receiving the trigger signal, the camera can immediately start recording images for a preprogrammed duration or duration specified in the trigger signal received from the processor or server. Here, the elevated humidity levels beyond a certain threshold can be interpreted by the system as indicating that rain or snow is either occurring or likely to occur.

In some implementations, a trigger signal can be generated according to a scheduled time or event. For example, a user can provide an input to the system indicating that the user would like to monitor a particular area at a scheduled time for a fixed duration. When the scheduled time arrives, a trigger signal can be generated to trigger monitoring operations by one or more monitoring devices. In some implementations when the monitoring system is integrated with a building monitoring system, if an entry or exit door of a building has not been opened for a certain period of time, e.g., 48 hours, indicating that no person is in the house or building, the monitoring system can periodically generate trigger signals to monitor potentially problematic areas around the house or building in the absence of the building manager or owner. This can be particularly helpful for owners or managers who are away from a property for extended periods of time.

After the monitoring system is initiated, the monitoring system can obtain image data from one or more monitoring devices and process the obtained image data (330). The monitoring system can use various suitable techniques to detect standing water or drainage problems.

According to one technique, the monitoring system can establish a baseline reference and compare images obtained with the baseline reference to determine if standing water or drainage problems are present. For instance, with reference to FIG. 4, the monitoring system can obtain one or more baseline reference images of a monitored area in the property when no weather events are occurring or when there is no standing water or drainage problem present, e.g., when the area is dry (410). The monitoring system can request user input or use machine learning methods to confirm or determine that no water damage or water management problem is present in an image. Image(s) with no water damage or water management problem present are designated as the baseline reference images for the monitored area.

Next, the monitoring system can obtain images during a monitoring period (420), e.g., when a weather event is occurring or in response to a trigger event, compare the obtained images with the images designated as the baseline reference or other obtained images (e.g., comparing a first obtained image with a reference image or with a second obtained image) (430), and determine whether water damage or a water management problem is present based on the comparison (440). For example, images obtained during the monitoring period can be obtained from one or more cameras. As described below, in some cases, the cameras can be equipped with polarization filters so that polarized images at different polarization angles can be obtained when desired. In some cases, the images can be taken from multiple cameras on the property so that multiple angles of potentially problematic areas are viewable through the images. In some implementations, images from various cameras at fixed positions can be combined to generate a 360° view, panoramic view, or other types of views of a property being monitored or a subsection of the property such as the potentially problematic area. The obtained images can be stored on a server, such as server 114 or server 218, or in a database that is connected to the server and configured to store monitoring data.

Various suitable techniques can be used to perform the image comparison. For example, blog detection, template matching, SURF feature extraction, or pixel-by-pixel comparison techniques can be used. These techniques can detect differences in images obtained from the monitoring devices and baseline reference images, e.g., difference in colors, brightness, shading, intensity, objects, and portions of images. In general, any processor and/or neural network processing and comparing the images can be configured to focus on the potentially problematic areas of a property and determine if an image difference corresponding to the presence of water has been detected. For example, if a property includes a downspout, a processor can be configured to focus the image comparison in an area of an image underneath and surrounding the downspout. Changes in the color, light intensity, and other characteristics in such an area can indicate the presence of standing water or other water management problems. For instance, the area below a downspout may have a brown or grey color if the area below the downspout is soil or concrete when there is no snow or rain. After rain or snow, the typical color (or other feature such as object shape like gravel, concrete, or stone tile) of that area would change if snow or rainwater accumulated. By performing an image comparison, such changes can be detected and signaled as an indication of water damage or a water management problem. The scenarios described above are examples only. Numerous variations are possible.

In support of the image comparison (430), the monitoring system can also use one or more filters to detect the presence of water in an image, which can be identified in an image as an area of glare, or as an area containing upside-down objects such as trees or buildings. To identify the presence of water, the monitoring system can use a motorized polarizing filter. As the filter rotates, water surfaces will appear to flash as the polarized angle changes. For instance, a polarization filter can be rotated at different angles. The polarization angle can modify the appearance of water in an image by making regions with water appear brighter similar to a flash of light (or transitory brightness above a brightness threshold level). Thus, as a polarization filter is rotated at different angles, water surfaces captured in a set of images can appear to flash on and off depending on the polarization angle of the polarization filter. In some implementations, image processing software that reproduces the effect of applying a motorized polarizing filter rotated at different angles can be used and applied on images after they are obtained from the cameras so that images obtained without a polarization filter can be used to detect the presence of water or water damage in an image.

In some implementations, multiple or moving cameras can be used to detect reflective surfaces via parallax. In some implementations, moving drones can work in pairs or take advantage of existing light sources to detect reflective surfaces. In some implementations, moving water can be detected using a frame-by-frame comparison. In some implementations, scene segmentation technology can be used to identify pools of water differentiated from surroundings. In some implementations, changes in reflectance over time can be used. For example, an image from a fixed camera can be compared with previous images from the same camera to identify regions of higher reflectance.

Through the image comparison (430), the monitoring system can make several determinations (440). For instance, the monitoring system can determine one or more areas around a building where water is present if such water was not present in the baseline reference images. The monitoring system can determine how long such a problem persists (how long standing water remains, how quickly runoff water appears and disappears relative to the rate of precipitation). The monitoring system can also determine a direction that water is moving and can determine if small streams of water are being formed or have formed. The monitoring system can estimate or provide an indication of how much water may have collected in an area.

In some implementations, the monitoring system can identify particular downspouts, gutters, drains, or covers that are damaged or compromised resulting in undesired water being present around the downspouts, gutters, drains, or covers. To do this, the monitoring system can distinguish between water collection or flow that is expected from water collection or flow that is not expected. For example, the monitoring system can detect some standing water around a drain and some standing water in an area where there is no drain. Because some standing water can be expected around a drain, the monitoring system may not flag the area around the drain as being problematic, but does flag the area with standing water and no drain as being problematic. In another example, sediment, leaves, or gravel build up is detected on a drain cover or grate in an image, the monitoring system can flag the area around the drain cover or grate as being potentially problematic.

In some implementations, the monitoring system can process images to identify indicators of water flow. For example, an image can be processed to detect a trail of mulch leading away from a mulch bed. Such a trail is often an indicator of a stream of water flowing away from the mulch bed. Accordingly, the monitoring system can use the detection of a mulch bed trail as an indication of a potential drainage problem or water flow problem.

In some implementations, the monitoring system can include multiple sensors such as rain gauges and sensors that can detect an amount of humidity in the air or moisture in a soil. If sensors detecting soil moisturizing content levels are deployed in various locations across a property, the monitoring system can generate a soil moisture map and identify the areas where more water is being absorbed into the soil and correlate such maps with weather and rainfall information.

In some implementations, the monitoring system can also include indoor sensors and cameras to detect humidity, water, moisture, water flow, or even spotting on a concrete wall inside a building. If unusual water and humidity levels or patterns are detected inside the building, the monitoring system can check weather data, water flow data, and/or perform drainage analysis to determine the cause of the unusual water and humidity levels or patterns, e.g., a plumbing problem, a chronic drainage issue, or a drainage issue precipitated by abnormal weather.

In some implementations, the monitoring system can deploy ground-based robots to collect soil moisture samples. In particular, ground probes can be attached to the wheels of a ground-based robot or a lawn mower (robotic or otherwise). Samples can be collected across the property using the ground probes. In some implementations, ground-penetrating radar can be used to detect changes in density under the ground surface. Damp soil, or even pools of underground water will have different density than dry soil, and can be identified by this method. Several snapshots taken over time after a heavy rain can provide details about how the ground is absorbing water at various points on the property.

In some implementations, the monitoring system can estimate the amount of water collected at different locations in the monitored property.

In some implementations, the monitoring system can build a topological map of the property and estimate likely problem areas based on high and low elevation points and existing drain positions. Various techniques can be used to perform this estimation. In some implementations, multiple cameras can be placed at different angles to infer depth measurements via stereoscopic depth perception. In some implementations, a camera mounted on a drone can take photos of the ground from multiple angles or multiple drones can take photos from different angles to provide depth estimates through multi-view geometry. The drone(s) can use a combination of GPS, VIO, inertial detection and visible landmarks to determine the drone(s)'s location as the drone(s) capture each image. A drone can also use explicit depth sensors, and/or LIDAR/sonar/radar to obtain more precise depth measurements as the drone traverses the property.

In some implementations, a ground-based robot (potentially combined with a robotic lawn mower) or a human-controlled lawn mower can use a high-precision altimeter to detect dips in the ground as it traverses the property. The ground-based robot or lawn mower can be used in combination with GPS, VIO, inertial detection and visible landmarks to correlate depth measurements with a position on a map of the property. In some implementations, fixed cameras can observe various ground-based targets (such as people and lawn mowers) as they move around the property, and calculate changes in their footprint altitude as they move.

In some implementations, using some of the techniques described above, the monitoring system can also be used to detect dry patches or areas of drought. Instead of identifying areas of high moisture, the monitoring system can be configured to identify areas of low moisture or no water. By continuing such monitoring over an extended period of time, the monitoring system can determine if such dryness is a continuous such that a drought may be occurring.

In some implementations, the monitoring system can estimate how much water is expected to be frozen at any given time based on expected and observed temperatures, video analytics, or other metrics. For instance, when the weather is below freezing or snow has just fallen, the monitoring system can closely monitor drainage across the property to identify ice, snow, and freezing water that could limit the flow of water out of the property and the flow coming from gutters and downspouts. Surface ice and/or snow can also obscure any liquid water that may or may not be draining below it. Accordingly, ice and snow can be accounted for as stored or "buffered" water. For instance, an inch of snow falling on a roof on the property is expected to stay there until it melts and enters the downspouts and the drainage system (failure to do so may indicate clogs or ice dams on the roof, which could trigger a notification). Modelling the predicted temperature of the roof at various future times (based on weather forecast, amount of snow accumulation, heat loss from the house, etc.) can help predict when water from a below-freezing precipitation event would actually enter the system as liquid water.

In some implementations, the monitoring system can identify an image that is unlikely or impossible to occur and flag such an image as an indication of the presence of water. For example, due to the reflective surface of water, an image may contain two skies, two suns, or other variations of mirror images that can only exist when a reflective surface such as water is present on the ground. When such images are detected, the monitoring system can flag such an image as likely including the presence of water, and identify the area with the reflective surface (e.g., if two suns are present in image, the sun that is lower in the image is likely the reflected image of sun on the ground) as being the location of the water damage or water management problem.

By using training data and neural networks, the performance of comparison operations and the correctness of the determinations based on the comparisons can be improved. For instance, the monitoring system may determine that standing water is present after a certain number of filter rotations or after determining that the color of an area where green grass is present in the baseline reference images has changed to another color (e.g., brownish black similar to that of standing water). However, if the monitoring system receives user feedback that such a determination is incorrect, the monitoring system may reconfigure itself to perform more filter rotations or to identify a revised color change before making a subsequent determination of standing water. In addition, thresholds for making determinations can be periodically or continuously updated through training images and updates to the neural networks. In some implementations, confidence thresholds can also be used such that only determinations made by the system that exceed a confidence threshold designated for a particular determination (e.g., that standing water is present) can be made.

After making a determination of whether water damage or a water management problem is present in an image of a potentially problematic area, the monitoring system can implement operations 340A, 340B, and 340C individually, sequentially, or simultaneously depending on the results of the image data processing. In operation 340A, the monitoring system can generate a report that provides results from the monitoring of the property. For example, the report can include a map or descriptions of problematic or potentially problematic areas in the property that may have water management issues to be addressed by the user such as standing water, damaged water drainage or pipes. The report can include details such as an amount of water in an area of the property, a flow of water in an area, or a damage type (e.g., clogged gutter, broken down sprout, broken water hydrant) in the area. The report can include a warning of the possibility of additional damage such as flooding or of possible sources of leaks in a building. The report can also include a forecast of additional damage, e.g., if additional rain is expected in the area within a certain time period of the report being generated. The report can be transmitted to a device associated with a user or an entity responsible for the property or designated by the user.

In some implementations in which the property includes a French drain or an underground drainage pipe, a baseline flow rate for an area around the French drain or underground drainage pipe can be determined based on detected standing water during a heavy rain and reported in the report. If that flow rate decreases during subsequent rains (e.g., if the standing water around the drain is estimated to be a larger volume, draining slower than expected, or accumulating faster than expected), the monitoring system may determine that the drain likely has an underground clog or other problem and include the likely problem in the report.

In some implementations of operation 340A, instead of or in addition to a report, the monitoring system can send an alert or notification message to a user device (e.g., user's phone, laptop, computer, iPad, iWatch, or any other suitable electronic device capable of connecting to a wireless network) indicative of a problem detected or an emergency detected on the problem. For example, if the monitoring system determines that the property is being flooded by runoff water, the monitoring system can transmit an emergency alert or notification to the user indicating that the property is being flooded by runoff water.

In operation 340B, the monitoring system can generate one or more recommendations to mitigate any damage or problems detected in the image data. For example, if the monitoring system determines that the images indicate a high likelihood of a broken drain or a clogged drain cover, the monitoring system can generate a recommendation to fix the broken drain or unclog the drain cover. As another example, if the monitoring system determines that an area has been experience prolonged dryness, the monitoring system can generate a recommendation to water the area.

In the recommendations, the monitoring system can include additional information to support the recommendations. For example, the monitoring system can include instructions for implementing the recommendations or advertisements for contractors near the property who could support an implementation of the recommendation (e.g., an advertisement for a plumber if there is a broken pipe).

In some implementations, the monitoring system can determine that image data for a particular area is not yielding satisfactory results for determining the water content in an area. The monitoring system can then recommend adding additional monitoring devices, such as cameras or sensors, in an effort to obtain more data for the particular area.

In some implementations, the monitoring system can take one or more remedial measures/actions if certain threshold conditions are determined to exist (340C). For example, if a water soil sample indicates that there is large water concentration around an area where a pipe is located, the large water concentration may indicate that the pipe has burst. In such instances, the monitoring system can contact the user and a local water distribution agency to indicate that a water pipe is likely broken thereby causing a substantial underground water leak. The monitoring system can contact the user and the local water distribution agency in various suitable ways, e.g., by sending an electronic message (e-mail, MMS, SMS), computer-generated phone call.

In some implementations when the monitoring system is aware that nobody is present at the property (e.g., by receiving such information from a user) and the monitoring system detects flooding near a building or a broken pipe with pouring water near a window or a basement, the monitoring system can contact the user and/or the fire department so that the user or fire department can take action to prevent additional damage to the property.

The above-described reports, recommendations, and actions can be generated or performed based on short-term and long-term monitoring and based on user-provided settings. Thus, if the user prefers not to receive recommendations, the monitoring system will not generate recommendations but can generate and transmit reports to the user. In some cases, the user can also provide information specifying a preference of remedial actions to be taken, and the monitoring system can conduct the remedial actions according to the user's preferences.

Figure 5:
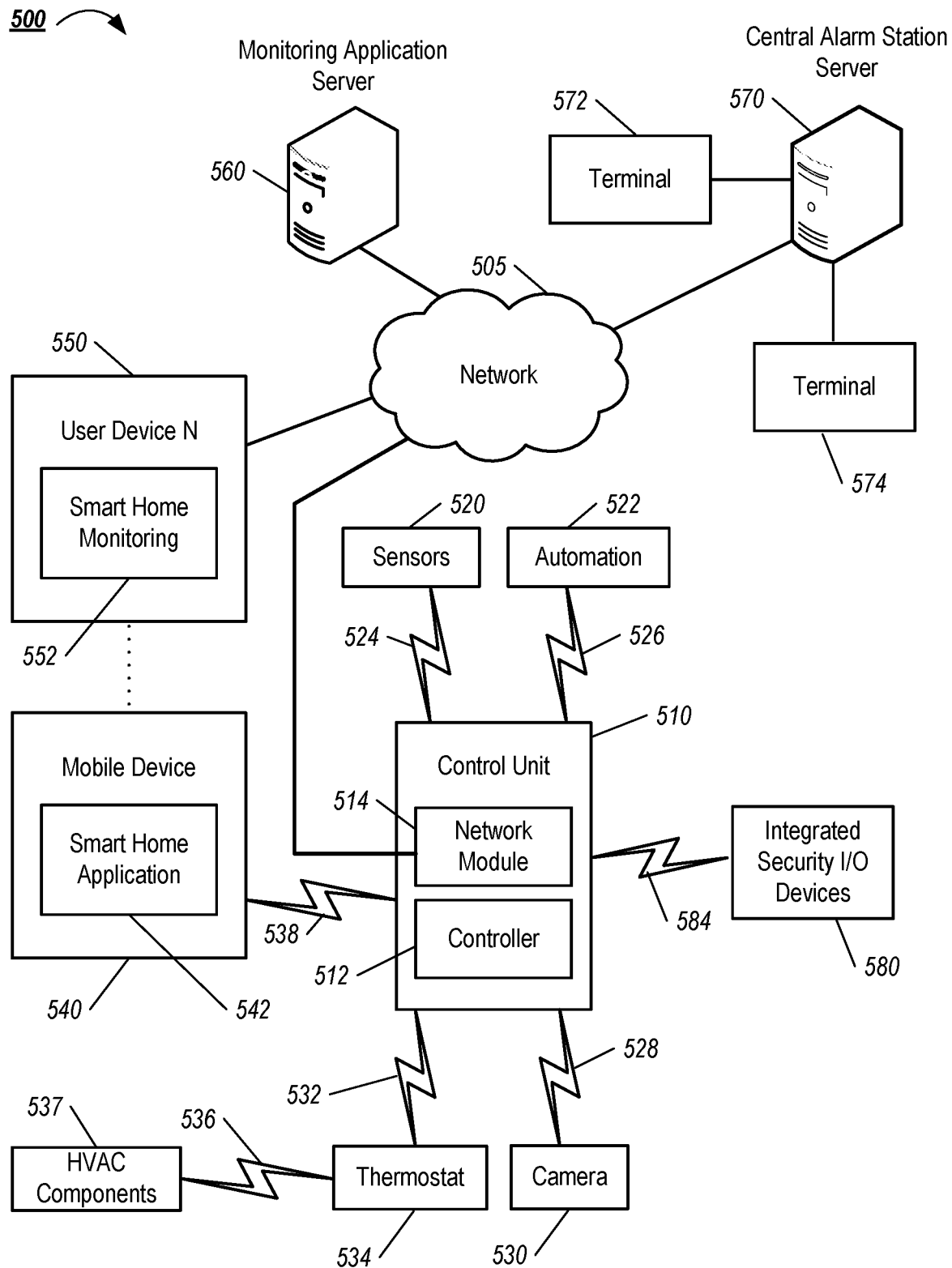
FIG. 5 depicts a block diagram of a monitoring system.

FIG. 5 depicts an example of the monitoring system 500 which can include a network 505, a control unit 510, one or more user devices 540 and 550, a monitoring application server 560, and a central alarm station server 570. In some examples, the network 505 facilitates communications between the control unit 510, the one or more user devices 540 and 550, the monitoring application server 560, and the central alarm station server 570.

The network 505 is configured to enable exchange of electronic communications between devices connected to the network 505. For example, the network 505 can be configured to enable exchange of electronic communications, such as weather and environmental data, sensor data, image data, recommendations, and/or reports, between the control unit 510, the one or more user devices 540 and 550, the monitoring application server 560, and the central alarm station server 570. The network 505 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 can include multiple networks or subnetworks, each of which can include, for example, a wired or wireless data pathway. The network 505 can include a circuit-switched network, a packet-switched data network, or any other network able to carry electronic communications (e.g., data or voice communications). For example, the network 505 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 505 can include one or more networks that include wireless data channels and wireless voice channels. The network 505 can be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 can include a processor or other control circuitry configured to execute instructions of a program that controls operation of a control unit system. In these examples, the controller 512 can be configured to receive input from sensors, cameras, or other monitoring devices included in the control unit system and control operations of devices included in the household (e.g., speakers, lights, doors, etc.). For example, the controller 512 can be configured to control operation of the network module 514 included in the control unit 510. As another example, the controller 512 can receive image data from a camera 530 and can send instructions to a light near the camera 530 to be turned on if the image data indicates poor lighting.

The network module 514 is a communication device configured to exchange communications over the network 505. The network module 514 can be a wireless communication module configured to exchange wireless communications over the network 505. For example, the network module 514 can be a wireless communication device configured to exchange communications over a wireless data channel and a wireless voice channel. In this example, the network module 514 can transmit alarm data over a wireless data channel and establish a two-way voice communication session over a wireless voice channel. The wireless communication device can include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also can be a wired communication module configured to exchange communications over the network 505 using a wired connection. For instance, the network module 514 can be a modem, a network interface card, or another type of network interface device. The network module 514 can be an Ethernet network card configured to enable the control unit 510 to communicate over a local area network and/or the Internet. The network module 514 also can be a voice band modem configured to enable the alarm panel to communicate over the telephone lines of Plain Old Telephone Systems (POTS).

The control unit system that includes the control unit 510 includes one or more sensors. For example, the monitoring system can include multiple sensors 520. The sensors 520 can include a lock sensor, a contact sensor, a motion sensor, or any other type of sensor included in a control unit system. The sensors 520 also can include an environmental sensor, such as a temperature sensor, a water sensor, a rain sensor, a wind sensor, a light sensor, a smoke detector, an air quality sensor, etc. In some examples, the sensors 520 can include a radio-frequency identification (RFID) sensor that identifies a particular article that includes a pre-assigned RFID tag.

The control unit 510 communicates with the automation module 522 and the camera 530 to perform monitoring. The module 522 is connected to one or more devices that enable home automation control. For instance, the module 522 can be connected to one or more lighting systems and can be configured to control operation of the one or more lighting systems. Also, the module 522 can be connected to one or more electronic locks at the property and can be configured to control operation of the one or more electronic locks (e.g., control Z-Wave locks using wireless communications in the Z-Wave protocol. Further, the module 522 can be connected to one or more appliances at the property and can be configured to control operation of the one or more appliances. The module 522 can include multiple modules that are each specific to the type of device being controlled in an automated manner. The module 522 can control the one or more devices based on commands received from the control unit 510. For instance, the module 522 can cause a lighting system to illuminate an area to provide a better image of the area when captured by a camera 530.

The camera 530 can be a video/photographic camera or other type of optical sensing device configured to capture images. For instance, the camera 530 can be configured to capture images of potentially problematic areas where standing water or drainage problems in or around a property are likely. The camera 530 can be configured to capture single, static images of the area and also video images of the area in which multiple images of the area are captured at various frequencies (e.g., thirty images per second or 2 images per second). The camera 530 can be controlled based on commands received from the control unit 510.

The camera 530 can be triggered by several different types of techniques. For instance, a Passive Infra-Red (PIR) motion sensor can be built into the camera 530 and used to trigger the camera 530 to capture one or more images when motion is detected. The camera 530 also can include or be integrated with a water or humidity sensor built into the camera and used to trigger the camera 530 to capture one or more images when motion is detected. The camera 530 can have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 can receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor can be used to determine if illumination is desired and can result in increased image quality.

The camera 530 can be programmed with any combination of time/day schedules, system "arming state", or other variables to determine whether images should be captured or not when triggers occur. The camera 530 can enter a low-power mode when not capturing images. In this case, the camera 530 can wake periodically to check for inbound messages from the controller 512. The camera 530 can be powered by internal, replaceable batteries if located remotely from the control unit 510. The camera 530 can employ a small solar cell to recharge the battery when light is available. Alternatively, the camera 530 can be powered by the controller's 512 power supply if the camera 530 is co-located with the controller 512.

In some implementations, the camera 530 communicates directly with the monitoring application server 560 or a processing server over the Internet. In these implementations, image data captured by the camera 530 does not pass through the control unit 510 and the camera 530 receives commands related to operation from the monitoring application server 560.

The system 500 also includes thermostat 534 to perform dynamic environmental control at the property. The thermostat 534 can be further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A HVAC module 537 is connected to one or more components of an HVAC system associated with a property, and is configured to control operation of the one or more components of the HVAC system. In some implementations, the module 537 can be connected to the internal power grid of the property and also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices. The robotic devices can be any type of robots that are capable of moving and taking actions that assist in security monitoring. For example, the robotic devices can include drones that are capable of moving throughout a property based on automated control technology and/or user input control provided by a user. In this example, the drones can be able to fly, roll, walk, or otherwise move about the property. The drones can include helicopter type devices (e.g., quad copters), rolling helicopter type devices (e.g., roller copter devices that can fly and also roll along the ground, walls, or roof) and land vehicle type devices (e.g., automated cars that drive around a property). In some cases, the robotic devices can be robotic devices that are intended for other purposes and merely associated with the system 500 for use in appropriate circumstances. For instance, a robotic lawn mower device can be associated with the monitoring system 500 as one of the robotic devices and can be controlled to take action responsive to monitoring system events.

In some examples, the robotic devices automatically navigate within a property. In these examples, the robotic devices include sensors and control processors that guide movement of the robotic devices within the property. For instance, the robotic devices can navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices can include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices can store data that describes attributes of the property. For instance, the robotic devices can store a layout and/or a three-dimensional model of the property that enables the robotic devices to navigate the property. During initial configuration, the robotic devices can receive the data describing attributes of the property, determine a frame of reference to the data (e.g., a home or reference location in the property), and navigate the property based on the frame of reference and the data describing attributes of the property. Further, initial configuration of the robotic devices also can include learning of one or more navigation patterns in which a user provides input to control the robotic devices to perform a specific navigation action (e.g., fly to downspout opening, move to standing water in a driveway). In this regard, the robotic devices can learn and store the navigation patterns such that the robotic devices can automatically repeat the specific navigation actions upon a later request.

In some examples, the robotic devices can include data capture and recording devices. In these examples, the robotic devices can include one or more cameras, one or more motion sensors, one or more microphones, one or more biometric data collection tools, one or more temperature sensors, one or more humidity sensors, one or more air flow sensors, and/or any other types of sensors that can be useful in capturing monitoring data related to the property and users in the property.

In some implementations, the robotic devices can include output devices. In these implementations, the robotic devices can include one or more displays, one or more speakers, and/or any type of output devices that allow the robotic devices to communicate information to a nearby user.

The robotic devices also can include a communication module that enables the robotic devices to communicate with the control unit 510, each other, and/or other devices. The communication module can be a wireless communication module that allows the robotic devices to communicate wirelessly. For instance, the communication module can be a Wi-Fi module that enables the robotic devices to communicate over a local wireless network at the property. The communication module further can be a 900 MHz wireless communication module that enables the robotic devices to communicate directly with the control unit 510. Other types of short-range wireless communication protocols, such as Bluetooth, Bluetooth LE, Zwave, Zigbee, etc., can be used to allow the robotic devices to communicate with other devices in the property.

The robotic devices further can include processor and storage capabilities. The robotic devices can include any suitable processing devices that enable the robotic devices to operate applications and perform the actions described throughout this disclosure. In addition, the robotic devices can include solid state electronic storage that enables the robotic devices to store applications, configuration data, collected sensor data, and/or any other type of information available to the robotic devices.

The robotic devices are associated with one or more charging stations. The charging stations can be located at predefined home base or reference locations in the property. The robotic devices can be configured to navigate to the charging stations after completion of tasks needed to be performed for the monitoring system 500. For instance, after completion of a monitoring operation or upon instruction by the control unit 510, the robotic devices can be configured to automatically fly to and land on one of the charging stations. In this regard, the robotic devices can automatically maintain a fully charged battery in a state in which the robotic devices are ready for use by the monitoring system 500.

The charging stations can be contact based charging stations and/or wireless charging stations. For contact based charging stations, the robotic devices can have readily accessible points of contact that the robotic devices are capable of positioning and mating with a corresponding contact on the charging station. For instance, a helicopter type robotic device can have an electronic contact on a portion of its landing gear that rests on and mates with an electronic pad of a charging station when the helicopter type robotic device lands on the charging station. The electronic contact on the robotic device can include a cover that opens to expose the electronic contact when the robotic device is charging and closes to cover and insulate the electronic contact when the robotic device is in operation.

For wireless charging stations, the robotic devices can charge through a wireless exchange of power. In these cases, the robotic devices need only locate themselves closely enough to the wireless charging stations for the wireless exchange of power to occur. In this regard, the positioning needed to land at a predefined home base or reference location in the property can be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device can always use a first charging station and a second robotic device can always use a second charging station.

In some examples, the robotic devices can share charging stations. For instance, the robotic devices can use one or more community charging stations that are capable of charging multiple robotic devices. The community charging station can be configured to charge multiple robotic devices in parallel. The community charging station can be configured to charge multiple robotic devices in serial such that the multiple robotic devices take turns charging and, when fully charged, return to a predefined home base or reference location in the property that is not associated with a charger. The number of community charging stations can be less than the number of robotic devices.

Also, the charging stations may not be assigned to specific robotic devices and can be capable of charging any of the robotic devices. In this regard, the robotic devices can use any suitable, unoccupied charging station when not in use. For instance, when one of the robotic devices has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices can include any type of device used to provide alerts based on received sensor data. For instance, the one or more control units 510 can provide one or more alerts to the one or more integrated security input/output devices. Additionally, the one or more control units 510 can receive one or more sensor data from the sensors 520 and determine whether to provide an alert to the one or more integrated security input/output devices 580.

The sensors 520, the module 522, the camera 530, the thermostat 534, and the integrated security devices 580 communicate with the controller 512 over communication links 524, 526, 528, 532, 584. The communication links 524, 526, 528, 532, 584 can be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 can continuously transmit sensed values to the controller 512, periodically transmit sensed values to the controller 512, or transmit sensed values to the controller 512 in response to a change in a sensed value.

The communication links 524, 526, 528, 532, 584 can include a local network. The sensors 520, the module 522, the camera 530, the thermostat 534, and the integrated security devices 580, and the controller 512 can exchange data and commands over the local network. The local network can include 802.11 "Wi-Fi" wireless Ethernet (e.g., using low-power Wi-Fi chipsets), Z-Wave, ZigBee, Bluetooth, or a Category 5 (CAT5) or Category 6 (CAT6) wired Ethernet network. The local network can be a mesh network constructed based on the devices connected to the mesh network.

The monitoring application server 560 or processing server is an electronic device configured to provide monitoring services by exchanging electronic communications with the control unit 510, the one or more user devices 540 and 550, and the central alarm station server 570 over the network 505. For example, the monitoring application server 560 can be configured to monitor environmental conditions (e.g., water damage). In this example, the monitoring application server 560 can exchange electronic communications with the network module 514 included in the control unit 510 to receive information regarding weather events (e.g., rain, snow). The monitoring application server 560 also can receive information regarding events from the one or more user devices 540 and 550.

In some examples, the monitoring application server 560 can route alert data received from the network module 514 or the one or more user devices 540 and 550 to the central alarm station server 570. For example, the monitoring application server 560 can transmit the alert data to the central alarm station server 570 over the network 505.

The monitoring application server 560 can store sensor and image data received from the monitoring system and perform analysis of sensor and image data received from the monitoring system. Based on the analysis, the monitoring application server 560 can communicate with and control aspects of the control unit 510 or the one or more user devices 540 and 550.

The central alarm station server 570 is an electronic device configured to provide alarm monitoring service by exchanging communications with the control unit 510, the one or more mobile devices 540 and 550, and the monitoring application server 560 over the network 505. For example, the central alarm station server 570 can be configured to generate in response to data indicative of an alarm condition such as a flooding in or around the property. In this example, the central alarm station server 570 can exchange communications with the network module 514 included in the control unit 510 and camera 530 or sensors 520 to receive information regarding the flooding. The central alarm station server 570 also can receive information regarding alerting events from the one or more mobile devices 540 and 550 and/or the monitoring application server 560.

The central alarm station server 570 is connected to multiple terminals 572 and 574. The terminals 572 and 574 can be used by users to process alerting events. For example, the central alarm station server 570 can route alerting data to the terminals 572 and 574 to enable a user to process the alerting data. The terminals 572 and 574 can include general-purpose computers (e.g., desktop personal computers, workstations, or laptop computers) that are configured to receive alerting data from a server in the central alarm station server 570 and render a display of information based on the alerting data. For instance, the controller 512 can control the network module 514 to transmit, to the central alarm station server 570, alerting data indicating that an emergency scenario such as flooding or property damage is occurring in the property. The central alarm station server 570 can receive the alerting data and route the alerting data to the terminal 572 for processing by a user associated with the terminal 572. The terminal 572 can render a display to the user that includes information associated with the alerting event and the user can handle the alerting event based on the displayed information.

In some implementations, the terminals 572 and 574 can be mobile devices or devices designed for a specific function. The one or more user devices 540 and 550 are devices that host and display user interfaces. For instance, the user device 540 is a mobile device that hosts one or more native applications (e.g., the property management application 542). The user device 540 can be a cellular phone or a non-cellular locally networked device with a display. The user device 540 can include a cell phone, a smart phone, a tablet PC, a personal digital assistant ("PDA"), or any other portable device configured to communicate over a network and display information. For example, implementations can also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 can perform functions unrelated to the monitoring system, such as placing personal telephone calls, playing music, playing video, displaying pictures, browsing the Internet, maintaining an electronic calendar, etc.

The user device 540 can include a property management application 542. The property management application 542 refers to a software/firmware program running on the corresponding mobile device that enables the user interface and features described throughout. The user device 540 can load or install the property management application 542 based on data received over a network or data received from local media. The property management application 542 runs on mobile devices platforms, such as iPhone, iPod touch, Blackberry, Google Android, Windows Mobile, etc. The property management application 542 enables the user device 540 to receive and process image and sensor data from the monitoring system. The property management application 542 can allow a user to view climate or environmental data associated with a building owned or managed by the user.

The user device 550 can be a general-purpose computer (e.g., a desktop personal computer, a workstation, or a laptop computer) that is configured to communicate with the monitoring application server 560 and/or the control unit 510 over the network 505. The user device 550 can be configured to display a property management user interface 552 that is generated by the user device 550 or generated by the monitoring application server 560. For example, the user device 550 can be configured to display a user interface (e.g., a web page) provided by the monitoring application server 560 that enables a user to perceive images captured by the camera 530 and/or reports related to the monitoring system.

In some implementations, the one or more user devices 540 and 550 communicate with and receive monitoring system data from the control unit 510 using the communication link 538. For instance, the one or more user devices 540 and 550 can communicate with the control unit 510 using various local wireless protocols such as Wi-Fi, Bluetooth, Zwave, ZigBee, or wired protocols such as Ethernet and USB, to connect the one or more user devices 540 and 550 to local security and automation equipment. The one or more user devices 540 and 550 can connect locally to the monitoring system and its sensors and other devices. The local connection can improve the speed of status and control communications because communicating through the network 505 with a remote server (e.g., the monitoring application server 560) can be significantly slower.

Although the one or more user devices 540 and 550 are shown as communicating with the control unit 510, the one or more user devices 540 and 550 can communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 can receive the data from the control unit 510 through the network 505 or the monitoring application server 560 can relay data received from the control unit 510 to the one or more user devices 540 and 550 through the network 505. In this regard, the monitoring application server 560 can facilitate communication between the one or more user devices 540 and 550 and the monitoring system.

In some implementations, the one or more user devices 540 and 550 can be configured to switch whether the one or more user devices 540 and 550 communicate with the control unit 510 directly (e.g., through link 538) or through the monitoring application server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision making. The system 500 can transmit the images captured by the camera 530 over a wireless WAN network to the user devices 540 and 550. Because transmission over a wireless WAN network can be relatively expensive, the system 500 uses several techniques to reduce costs while providing access to significant levels of useful visual information.

The described systems, methods, and techniques can be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed ASICs (application-specific integrated circuits).

A computer program, also known as a program, software, software application, script, plug-in, or code, can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data in a single file dedicated to the program in question, or in multiple coordinated files. A computer program can be executed on one computer or on multiple computers that are located at one site or distributed across multiple sites and interconnected by a communication network.

While this specification contains many specifics, these should not be construed as limitations on the scope of the disclosure or of what can be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and can even be claimed as such, one or more features from a claimed combination can, in some cases, be excised from the combination, and the claimed combination can be directed to a sub-combination or variation of a sub-combination.

Similarly, the separation of various system components in the embodiments described above should not be understood as requiring such separation in all embodiments, and it should be understood that the described program components and systems can generally be integrated together in a single software product or packaged into multiple software products. For example, although some operations are described as being performed by a processing server, one of more of the operations can be performed by the smart meter or other network components.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims can be performed in a different order and still achieve desirable results. Accordingly, other implementations also are within the scope of the claims.

What is claimed is:

1. A computer-implemented method comprising:
   determining potentially problematic locations associated with a property to monitor based on information obtained about the property;
   obtaining image data using a monitoring device connected to a monitoring network to monitor the potentially problematic locations associated with the property;
   comparing a first image of the image data with a reference image or a second image of the image data;
   identifying an indication of water damage or water management problem in at least one of the potentially problematic locations based on the comparing;
   determining that water damage or a water management problem is present in at least one of the potentially problematic locations in response to identifying the indication of water damage or water management problem in at least one of the potentially problematic locations; and
   transmitting, to an electronic device associated with a user, an indication that a particular location at the property has water damage or a water management problem.

2. The computer-implemented method of claim 1, wherein:
   the information obtained about the property comprises one or more of an address of the property, terrain information of an area around the property, dwellings in the property, a layout of a home on the property, or pipes and drains in and connected to the property, and
   the potentially problematic locations associated with the property comprise one or more of a hill, a slanted ground level inclining downwards towards a building on the property, or an area at a bottom of a slanted ground or hill.

3. The computer-implemented method of claim 1, comprising:
training a neural network to identify problematic locations with data indicative of water damage or water management problems.

4. The computer-implemented method of claim 3, wherein the data indicative of water damage or water management problems comprises at least one of:
training image data of the water damage or the water management problems near a building obtained from different angles; and
keywords identifying water damage or a water management problem in an image.

5. The computer-implemented method of claim 1, wherein:
the monitoring device comprises a sensor or a camera; and
the obtaining of the image data to monitor the potentially problematic locations associated with the property is performed in response to receiving a trigger signal from a server.

6. The computer-implemented method of claim 5, comprising:
generating the trigger signal in response to a likely occurrence of a weather event, a scheduled time to perform monitoring of the property, or data received from a second monitoring device different from the monitoring device.

7. The computer-implemented method of claim 1, wherein:
the first image of the image data is obtained using a polarization filter configured at a first angle; and
the second image of the image data is obtained using the polarization filter configured at a second angle different from the first angle.

8. The computer-implemented method of claim 1, wherein:
the first image of the image data is obtained using a camera as the monitoring device; and
the reference image is an image without a presence of the water damage or the water management problem in the potentially problematic locations associated with a property.

9. The computer-implemented method of claim 1, wherein identifying the indication of water damage or water management problem in the at least one of the potentially problematic locations comprises:
detecting transitory brightness in an area in the first image greater than a threshold brightness level.

10. A non-transitory computer-readable storage medium comprising instructions, which, when executed by a computer processor, cause the computer processor to perform operations comprising:
determining potentially problematic locations associated with a property to monitor based on information obtained about the property;
obtaining image data using a monitoring device connected to a monitoring network to monitor the potentially problematic locations associated with the property;
comparing a first image of the image data with a reference image or a second image of the image data;
identifying an indication of water damage or water management problem in at least one of the potentially problematic locations based on the comparing;
determining that water damage or a water management problem is present in at least one of the potentially problematic locations in response to identifying the indication of water damage or water management problem in at least one of the potentially problematic locations; and
transmitting, to an electronic device associated with a user, an indication that a particular location at the property has water damage or a water management problem.

11. The non-transitory computer-readable storage medium of claim 10, wherein:
the information obtained about the property comprises one or more of an address of the property, terrain information of an area around the property, dwellings in the property, a layout of a home on the property, or pipes and drains in and connected to the property, and
the potentially problematic locations associated with the property comprise one or more of a hill, a slanted ground level inclining downwards towards a building on the property, or an area at a bottom of a slanted ground or hill.

12. The non-transitory computer-readable storage medium of claim 10, the operations comprise:
training a neural network to identify problematic locations with data indicative of water damage or water management problems, wherein the data indicative of water damage or water management problems comprises at least one of:
training image data of the water damage or the water management problems near a building obtained from different angles; and
keywords identifying water damage or a water management problem in an image.

13. The non-transitory computer-readable storage medium of claim 10, wherein:
the monitoring device comprises a sensor or a camera;
the obtaining of the image data to monitor the potentially problematic locations associated with the property is performed in response to receiving a trigger signal from a server; and
the operations comprise:
generating the trigger signal in response to a likely occurrence of a weather event, a scheduled time to perform monitoring of the property, or data received from a second monitoring device different from the monitoring device.

14. The non-transitory computer-readable storage medium of claim 10, wherein:
the first image of the image data is obtained using a polarization filter configured at a first angle;
the second image of the image data is obtained using the polarization filter configured at a second angle different from the first angle; and
identifying the indication of water damage or water management problem in the at least one of the potentially problematic locations comprises:
detecting transitory brightness in an area in the first image greater than a threshold brightness level.

15. The non-transitory computer-readable storage medium of claim 10, wherein:
the first image of the image data is obtained using a camera as the monitoring device; and
the reference image is an image without a presence of the water damage or the water management problem in the potentially problematic locations associated with a property.

16. A system comprising:

a monitoring device connected to a monitoring network to monitor potentially problematic locations associated with a property; and a processor and a storage device storing instructions that are operable, when executed by the processor, to cause the processor to perform operations comprising:

determining the potentially problematic locations associated with the property to monitor based on information obtained about the property;

obtaining image data using the monitoring device;

comparing a first image of the image data with a reference image or a second image of the image data;

identifying an indication of water damage or water management problem in at least one of the potentially problematic locations based on the comparing;

determining that water damage or a water management problem is present in at least one of the potentially problematic locations in response to identifying the indication of water damage or water management problem in at least one of the potentially problematic locations; and transmitting, to an electronic device associated with a user, an indication that a particular location at the property has water damage or a water management problem.

17. The system of claim 16, wherein the operations comprise:

training a neural network to identify problematic locations with data indicative of water damage or water management problems, wherein the data indicative of water damage or water management problems comprises at least one of:

training image data of the water damage or the water management problems near a building obtained from different angles; and keywords identifying water damage or a water management problem in an image.

18. The system of claim 16, wherein:

the monitoring device comprises a sensor or a camera;

the obtaining of the image data to monitor the potentially problematic locations is performed in response to receiving a trigger signal from a server; and the operations comprise:

generating the trigger signal in response to a likely occurrence of a weather event, a scheduled time to perform monitoring of the property, or data received from a second monitoring device different from the monitoring device.

19. The system of claim 16, wherein:

the first image of the image data is obtained using a polarization filter configured at a first angle;

the second image of the image data is obtained using the polarization filter configured at a second angle different from the first angle; and identifying the indication of water damage or water management problem in the at least one of the potentially problematic locations comprises:

detecting transitory brightness in an area in the first image greater than a threshold brightness level.

20. The system of claim 16, wherein:

the first image of the image data is obtained using a camera as the monitoring device; and the reference image is an image without a presence of the water damage or the water management problem in the potentially problematic locations.

\* \* \* \* \*